United States Patent [19]

Goswami et al.

[11] Patent Number: 4,604,230

[45] Date of Patent: Aug. 5, 1986

[54] THERMALLY STABLE ADHESIVE

[75] Inventors: Jagadish C. Goswami, New City, N.Y.; Joseph A. Aurichio, Anderson, S.C.; Joseph R. Zingaro, Fairfield, Conn.

[73] Assignee: Stauffer Chemical Company, Westport, Conn.

[21] Appl. No.: 660,593

[22] Filed: Oct. 15, 1984

[51] Int. Cl.$^4$ .............................................. H01B 1/02
[52] U.S. Cl. .................................... 252/514; 252/512; 523/400; 523/443; 523/444; 523/448; 525/112; 525/423
[58] Field of Search ................ 525/112, 423; 252/512, 252/514; 523/400, 443, 444, 458; 524/439, 440

[56] References Cited

U.S. PATENT DOCUMENTS

| | | | |
|---|---|---|---|
| 2,864,774 | 12/1958 | Robinson | 252/514 |
| 3,073,784 | 1/1963 | Eudrey | 252/518 |
| 3,684,533 | 8/1972 | Conwicke | 106/1 |
| 3,746,662 | 7/1973 | Adelman | 252/213 |
| 4,147,669 | 4/1979 | Shaheen et al. | 252/512 |
| 4,181,643 | 1/1980 | Kreibich et al. | 260/40 R |
| 4,210,704 | 7/1980 | Chandross et al. | 428/414 |
| 4,311,615 | 1/1982 | Taylor et al. | 252/514 |
| 4,312,793 | 1/1982 | Charneski et al. | 252/513 |
| 4,401,767 | 8/1983 | Dietz et al. | 501/19 |
| 4,436,785 | 3/1984 | Dietz et al. | 428/427 |
| 4,459,166 | 7/1984 | Dietz et al. | 156/89 |
| 4,519,941 | 5/1985 | Anderson | 252/514 |

FOREIGN PATENT DOCUMENTS 1258241 12/1971 United Kingdom .
1256531 12/1971 United Kingdom .

OTHER PUBLICATIONS

R. Dietz, et al., "An Innovation in Materials for Attaching Silicon Devices", 1982, Int. J. Hybrid Microelectronics, 5(2), 480–486.

C. C. Proctor, "Conductive Adhesives", May/Jun. 1982, Paint & Resin, 52(3), 18–21.

*Primary Examiner*—Theodore E. Pertilla

[57] ABSTRACT

A novel adhesive exhibiting low outgassing upon exposure to high temperature is disclosed. The instant adhesive comprises: (a) a soluble polyimide resin, (b) a solvent for said polyimide resin, (c) a tackifier, (d) an epoxy resin, (e) a hardener for said epoxy resin, (f) a catalyst which catalyzes the reaction between the epoxy and hardener, (g) a cross-linking agent reactive with the polyimide solvent of (b), (h) a catalyst which accelerates the reaction between (b) and (g), and (i) a filler material. Optionally, the adhesive may also contain a conductive material. A process for making the adhesive is also disclosed.

97 Claims, No Drawings

THERMALLY STABLE ADHESIVE

FIELD OF THE INVENTION

The present invention relates to an adhesive composition as a die attach material which exhibits very low levels of outgassing upon exposure to high temperatures.

BACKGROUND OF THE INVENTION

Adhesive compositions, particularly conductive adhesives, have recently gained great popularity in the microelectronics industry. These adhesives are used for a variety of purposes with one of the more prominent uses being the attachment of a semiconductor, die, dies or chips, to a substrate, or other support medium. One common problem associated with these adhesives is that upon exposure to high temperatures they exhibit a tendency to undergo outgassing, wherein absorbed or occluded gases, formed during the curing of the adhesive, or during subsequent heat aging of the cured adhesive due to thermal instability, are released. This is a critical problem since, all too often, the success or failure of an electrical component is a direct function of the degree of outgassing undergone by the adhesive resulting in void formation within the adhesive, thereby adversely affecting the thermal and electrical properties of the adhesive.

A number of conductive and thermally stable adhesives have been reported. In U.S. Pat. No. 4,147,669, there is disclosed an electrically and thermally conductive adhesive containing an alloy formed by first mixing together gallium and tin to form an eutectic mixture, mixing a powdered metal such as gold, silver or copper with this mixture to form an alloy and then mixing a resin with a curing agent with this alloy. The resin and curing agent disclosed in this patent are any conventional type known to those skilled in the art.

In U.S. Pat. No. 4,311,615, there is disclosed an electrically conductive film comprised of a palladium (II) polyamic acid compound and an appropriate solvent such as N-methyl-2-pyrrolidone or the like. The inventors in the above patent disclose that the conductivity of the adhesive is a function of the presence of the palladium (II) ions.

U.S. Pat. 3,073,784 discloses an adhesive composition comprised of an organic diamine and a tetracarboxylic acid anhydride dissolved in an organic solvent. Silver is disclosed as the conductive agent.

U.S. Pat. No. 3,684,533 discloses a screen printable solder composition comprised of an active hydrogen-containing compound selected from the group of hydroxyl substituted aliphatic, mononuclear aromatic or polynuclear aromatic amines, rosin, or organic solvent and a thixotropic agent.

U.S. Pat. No. 3,746,662 discloses a thermally and/or electrically conductive polymerizable dispersion comprised of an epoxy resin, a curing agent, a powdered tough polymer component, and metal particles. The conductivity of the disclosed adhesive is increased by polar groups such as free hydroxyls or carboxyls on the epoxy resin.

U.S. Pat. No. 2,864,774 discloses a conductive composition wherein the conductive properties are attained by the in situ formation of cryptocrystalline metallic particles within a resin composition.

U.S. Pat. No. 3,677,974 discloses an electrically conductive adhesive comprised of 25-35 parts of a novolak-epoxy resin, 65-75 parts of particulate silver and 0.5-1.4 parts by weight of an imizadole curing agent.

SUMMARY OF THE INVENTION

In accordance with the present invention, there is disclosed a novel adhesive which exhibits very low levels of outgassing upon exposure to high temperatures. The adhesive of the present invention aso exhibits low volume resistivity thereby showing good electrical conductivity.

The adhesive of the present invention comprises a soluble polyimide resin, a polymerizable and/or cross-linkable solvent for the polyimide resin, a tackifier, which imparts a tacky state to the B-staged (partially cured) adhesive film, a polyfunctional epoxy resin, a conventional epoxy hardener, a catalyst which catalyzes the reaction of the epoxy and hardener, a cross-linking agent reactive with said polyimide solvent, a catalyst capable of catalyzing said cross-linking reaction between said polyimide solvent and said cross-linking agent, and a filler material which improves the wetting properties of said adhesive composition. Optionally, a conductive material imbuing electrically conductive properties upon the adhesive composition of the present invention may be added.

There is also disclosed a process for producing the adhesive of the present invention which comprises:

(a) mixing together the polyimide resin and the polyimide solvent, (b) adding the tackifier which imparts tackiness to the B-staged adhesive film, (c) mixing together the epoxy and curing agent for the epoxy and then adding this mixture to (b), (d) adding a catalyst dissolved in the polyimide solvent to mixture (c), (e) mixing together the second cross-linking agent and a catalyst which catalyzes the cross-linking reaction between the cross-linking agent and the polyimide solvent and adding this mixture to the mixture of (d), and (f) adding a suitable amount of filler.

Optionally, a suitable amount of a conductive material may be added if conductive properties are desired.

DETAILED DESCRIPTION OF THE INVENTION

The soluble polyimide component of the present invention is present at from about 1.5% to about 21%, by weight of the adhesive composition, preferably from about 3% to about 9%. The type of polyimide resins described in U.S. Pat. No. 3,856,752 to J. Batemen et al. which are commercially available from Ciba-Geigy Corporation, e.g. under the trademark XU218, are suitable resins which can be utilized. These are fully imidized polyimide resins which are soluble in various solvents. They are derived from phenylindane diamines and dianhydrides as described more fully in the above-referenced U.S. patent which is incorporated herein by reference. The polyimides are prepared by reacting a phenylindane diamine with a dianhydride in an organic reaction medium which is a solvent for at least one of the reactants, preferably under anhydrous conditions under 100° C. The resulting product is a polyimide acid which is then converted to the desired polyimide by one of several methods: heating the polyamide acid solution until imidizationis substantially complete; or by combining the polyamide acid solution and a dehydrating agent, with or without catalyst, and optionally heating the resulting mixture until imidization is substantially complete. Thus, it will be appreciated that a polyamide acid solution, or a partially imidized polyamide solution, provided it is soluble in the poliymide solvent of the preset invention, can also be used in the present invention.

In order to insure dissolution of the polyimide component of the present invention into the epoxy resin component to be described below, a solvent for the polyimide component is used. Although any conventional polyimide solvent such as, for example, a neutral solvent known to those skilled in the art to which this invention pertains, can be used, it is preferable to use a solvent which is a reactive moiety capable of forming cross-linkages with another component of the present adhesive composition. Thus, the use of a reactive solvent minimizes the possibility of void formation encountered during later volatilization procedures which would be necessary if a neutral solvent were to be used. Environmental considerations may also determine the choice of solvent.

The polyimide solvent of the present invention is chosen from the group of monovinyl unsaturated compounds or other suitable unsaturated compounds having one or more unsaturated sites. A preferred solvent of the present invention is N-vinyl pyrrolidinone. The solvent is present in an amount ranging from about 15% to abouy 60%, by weight of the adhesive composition, preferably from about 21% to about 45%. If necessary, a small amount <5% of a neutral, or non-reactive solvent for the polyimide, such as N-methyl pyrrolidinone or N-cyclohexyl pyrrolidinone can be added to decrease the viscosity of the mixture.

The present invention also contemplates the use of a tackifier present in an amount ranging from about 0.3% to about 3%, by weight of the adhesive composition, preferably from about 0.3% to about 1.5%. The tackifier agent imparts tackiness to the B-staged adhesive film. A list of suitable tackifiers can be found in MODERN PLASTICS (1976). A preferred compound of the present invention is polyvinyl pyrrolidinone.

The epoxy resin component which forms a portion of the present adhesive (from about 3% to about 30% by weight of the adhesive composition, preferably from about 6% to about 15%) is a conventional crosslinkable polyfunctional epoxy resin. The epoxy resins useful in this invention are those resins which contain more than one 1,2-epoxy group per molecule. They can be saturated or unsaturated aliphatic, cycloaliphatic, or heterocyclic groups and can be monomeric or polymeric in nature. The weight per epoxide of such resins can be within the range of about 100 to about 2,000.

Useful epoxy resins are the glycidyl polyethers of polyhydric phenols which are derived from an epihalohydrin, e.g., epichlorohydrin, and a polyhydric phenol. Examples of such polyhydric phenols include resorcinol, hydroquinone, bis (4-hydroxyphenyl)-2,2-propane (or "bisphenol A" as it is commony known), 4,4'-dihydroxybenzophenone, bis(4-hydroxyphenyl)-1,1-ethane, bis (4-hydroxyphenyl)-1,1-isobutane, bis (4-hydroxyphenyl)-2,2-butane, bis(2-dihydroxynaphthyl)methane, phloroglucinol, and bis)4-hydroxyphenyl)sulphone. Additional polyhhydric phenols are novolac resins containing more than two phenol, or substituted phenol, moieties linked through methylene bridges, as well as halogenated, e.g., brominated and chlorinated, phenolic compounds.

Additional epoxy resins are glycidyl polyethers of polyhydric alcohols prepared by reacting a polyhydric alcohol with an epihalohydrin using a Lewis acid catalyst, e.g., boron trifluoride, and subsequently treating the resulting product with an alkaline dehydrogenating agent. Included among the polyhydric alcohols that can be used in the preparation of these polyepoxy materials are glycerine, ethylene glycol, propylene glycol, diethylene glycol, hexanediol, hexanetriol, trimethylol propane, trimethylol ethane, pentaerythritol and the like.

Other epoxy resins are glycidyl esters of polycarboxylic acids which are derived from an epihalohydrin and a polycarboxylic acid. Examples of polycarboxylic acids include phthalic acid or its anhydride, isophthalic acid, terephthalic acid, tetrahydrophthalic acid, hexahydrophtalic anhydride, adipic acid, dimerized fatty acids, dibasic acids made from an unsaturated fatty acid and acrylic acid, and the like.

The most preferred epoxy resins are glycidyl polyethers of polyhydric phenols, particularly the glycidyl polyether of bisphenol A and epoxylate phenol or cresol novolac resins.

Another component of the present invention is a conventional hardener or curing agent for the epoxy resin. The hardener is present in an amount ranging from about 3% to about 30% by weight of the adhesive composition, preferably from about 6% to about 15%. Any conventional hardener which acts by cross-linking the epoxy resin to cure the system can be chosen.

Representative hardeners include aliphatic polyamines having at least three active amine hydrogen atoms per molecule. Examples of such amines are the polyalkylene polyamines, e.g. diethylene triamine, triethylene tetraamine, tetraethylene pentamine and pentaethylene hexamine. Additional useful amines are ethylene diamine, tetramethylene diamine, hexamethylene diamine, xylene diamine, and the like. Adducts of such amines with acrylonitrile, acrylic acid, ethyl acrylate and the like are also useful if the adduct contains at least three active amine hydrogen atoms. Also included as useful amines are amidoamines obtained by reacting polyamines with fatty acids, both monomers and dimers, provided of course that the resulting amidoamine contains at least three active amine hydrogen atoms per molcecule.

Additional curing agents, or hardeners, which can be used with the compositions of this invention include the amine terminated polyamides, aromatic amines, mercaptans, anhydrides, isocyanates and catalyst/latent hardeners such as boron trifluoride, monoethylamine and dicyandiamide.

Representative aromatic amines include metaphenylene diamine, 4,4'-methylenediamine, p-aminophenyl sulfone, benzyldimethylamine and the like. Exemplary anhydride hardeners are MADIC METHYL ANHYDRIDE BRAND hardener (methyl-bicyclo[2.2.1]heptene-2,3-dicarboxcylic anhydride isomers) available from Polysciences Corporation, hexahydrophthalic anhydride, phthalic anhydride, pyromellitic dianhydride, maleic anhydride, trimellitic anhydride, benzophenone tetracarboxylic dianhydride, chlorendic anhydride and dodecenylsuccinic anhydride.

To accelerate the reaction between the epoxy resin and the curing agent, there is used a catalyst ranging from about 0.3% to about 3% by weight of the adhesive composition, preferably from about 1.5% to about 3%. The preferred catalyst is an alkyl or aryl substituted imidazole catalyst. Preferred catalysts which may be used in the present invention include 2-ethyl, 2-methyl imidazole, (EMI, Aldrich Chemical), 1-methylimidazole, 1-benzyl-2-methylimidazole and the like.

The cross-linking agent of the present invention is present in amounts ranging from about 15% to about 60% by weight of the adhesive composition, preferably 21% to about 45%. The cross-linking agent is reactive with the polyimide solvent and is chosen from the group consisting of polyethylenically unsaturated organic compounds copolymerizable with monovinyl or other ethylenically unsaturated organic compounds.

Representative cross-linking agents include, but are not limited to, triallyl-S-triazine-2,4,6 trione, triallyl cyanurate, triallyl phosphate, triallyl phosphite, triallyl trimellitate, triallyl trimesate, tetrallyl pyromellitate, diallyl diglycolate, diallyl diglycol carbonate, diallyl fumarate, diallyl isocyanate, diallyl itaconate, diallyl maleate, diallyl malonate, diallyl phthalate, and divinyl compounds, e.g. divinyl sulfone, divinyl sebacate, divinyl ethers and divinyl benzene.

Other compounds useful as cross-linking agents in the composition of the present invention include: glycol diacrylates and triacrylates, glycol di- and tri-methacrylates, ethylene glycol dimethacrylate, propylene glycol dimethacrylate, 1,3-butylene glycol dimethacrylate, and trimethylol propane trimethacrylate.

Additional compounds useful as cross-linking agents in the present invention include: diallyl succinate, diallyl adipate, diallyl sebacate, diallyl ethylene carbonate, triallyl aconitate, triallyl borate, triallyl citrate, triallyl pyromellitate, triallyl aluminate, triallyl titanate, tetraallyl benzene tetracarboxylate, tetrallyl thiophosphonate, and triallyl phenylphosphate.

To facilitate the cross-linking reaction between the polyimide solvent and the cross-linking agent, the present invention uses a catalyst in amounts ranging from about 1.5% to about 15% by weight of the adhesive mixture, preferably from abut 3% to about 9%. Contemplated catalysts usable in the present invention include any free radical generating polmyerization catalyst having a half life preferably, but not nessarily, of the same order as the cure time at the temperature chosen, said temperature to be described in the process section hereinafter.

Preferred catalysts are organic peroxides (Lucidol Division, Penwalt Company) including, for example, di-t-butyl peroxide, t-butyl peroxypivalate, 2,4-dichlorobenzoyl peroxide, caprylyl peroxide, lauroyl peroxide, propionyl peroxide, acetyl peroxide, t-butylperoxyisobutyrate, p-chlorobenzoyl peroxide, benzoyl peroxide, hydroxyheptyl peroxide, cyclohexanone peroxide, 2,5-dimethylhexyl-2,5-di(peroxybenzoate), di-t-butyl diperphthalate, t-butylperacetate, t-butylperbenzoate, dicumyl peroxide, 2,5-dimethyl-2,5-di(t-butylperoxy)hexane, t-butyl hydroperoxide, methyl ethyl ketone peroxides, p-methane hypoperoxide, cumene hydroperoxide, 2,5-dimethylhexyl-2,5-dihydroperoxide, and t-butyl hydroperoxide.

Also useful as catalysts in the present invention are gem-diperoxides (as defined in O. Hagell and S. Sheppard Encyclopedia of Chemical Technology, Vol. 14 (1967) p.786) or peroxyketals having the formula:

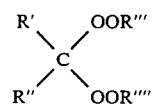

wherein R', R", R'" and R"" are the same or different and are hydrogen, alkyl of from 1 to 20 carbon atoms, alkenyl, aryl, aralkyl, alkaryl, haloalkl, haloalkenyl, haloaryl or a heterocyclic moiety.

Representative peroxyketals useful in the present invention include, 1,1-bis(butylperoxy)3,3,5-trimethylcyclohexane, 1,1-di-(t-butylperoxy)cyclohexane, 2,2-bis(t-butylperoxy)butane, ethyl 3,3-di(butylperoxy)butyrate, n-butyl-4,4-bis(t-butylperoxy)valerate.

Other peroxide derivatives useful as catalysts in the present invention are t-amyl peroxides (Lucidol Division, Pennwalt Company). Representative t-amyl peroxides include: t-amylperoxyneodecanoate, t-amylperoxyneoheptanoate, t-amylperoxy pivalate, t-amylperoxy-2-ethyl hexanoate, t-amyl peroxybenzoate, t-amyl peroxyacetate, 1,1-di-(t-amylperoxy)cyclohexane, 2,2-di-(t-amylperoxy)propane ethyl 3,3-di-(t-amylperoxy)butyrate, and OO-t-amyl O-(2-ethylhexyl)-monoperoxycarbonate.

Also useful as a catalyst in the present invention is the compound 1,1-azobis(cyclohexanecarbonitrile) sold under the trademark VAZO® 88 by DuPont Company.

To improve the print (wettability of the adhesive composition to the polyolefin carrier film used as a substrate for the transfer of the adhesive, to be described more fully below), the adhesive composition of the present invention has incorporated therein a filler such as glass, silica (e.g. Cab-O-Sil silica filler) in an amount ranging from about 0.3% to about 30% by weight of the adhesive composition, preferably from about 0.3% to about 21%. The filler also assists in the reduction of voids or pinholes generated in the cured adhesive. The preferred filler is glass of a size less than 10 microns available from Transene Corporation, under the designation TGC-230, TGC-10, etc. If a glass filler is used, preferably the melting point of the glass should be between 350° C. and 500° C. If silica is used as a filler, the size should be less than 1 micron. Said grade of silica is available from Degussa and sold under the designation TS-100.

The metals in the suspensions of the present invention are used to impart electrical conductivity to the adhesive of the present invention. The metal particles are employed in an amount ranging from about 50% to abut 75% by weight of the adhesive composition, preferably from about 55% to about 70%. To achieve volume resistivity in the final cured product of 0.1 ohm/cm or less, it is preferred that the particles be noble metals such as silver or gold or noble metals coated on non-noble metals such as copper, iron, nickel, or aluminum. For easy dispersion, the metal particles should preferably be of a size less than 10 microns. The preferred metal is silver and a preferred grade of silver is that sold under the designations SF-235, SF-282, etc. (Silver powder) by Handy and Harman.

A representative non-limiting, procedure for the preparation of the adhesive composition employed herein is as follows:

The soluble polyimide resin, in an amount ranging from about 0.25 gram to about 0.35 gram (about 1% to about 2% by weight of the final adhesive composition) is dissolved in a polyimide solvent. The amount of polyimide solvent used ranges from about 1.0 to about 2.0 grams with the amount ultimately determined by how well the polyimide dissolves in the solvent. The polyimide-polyimide solvent mixture is heated to abut 80° C.

After the polyimide is in solution, a suitable amount of a tackifier ranging from about 0.01 gram to about 0.10 gram (about 0.1% to about 1% by weight of the final adhesive composition) is added to the solution. This tackifier imparts tackiness to the B-staged adhesive film.

After the above mixture has become a homogeneous solution, i.e. a clear solution, a suitable amount of epoxy resin plus hardener, said amount of resin plus hardener usually comprising an approximately 1:1 ratio of resin to hardener, and said amount of resin plus hardener further comprising an amount of from about 0.2 to about 1.0 grams of resin (about 3% to about 10% by weight of the final adhesive composition) and from about 0.1 to about 1.0 gram of hardener (from abut 3% to about 10% by weight of the final adhesive composition) is added.

The above solution is allowed to cool down and a suitable amount, ranging from about 0.1 to about 0.5 gram (about 0.1% to about 1% by weight of the final adhesive composition) of a catalyst which accelerates the curing of the epoxy resin is added. Preferably, this catalyst is dissolved in the polyimide solvent.

To the above solution is then added a suitable amount, ranging from about 1.0 to about 3.0 grams (about 7.5% to about 20% by weight of the final adhesive composition) of a previously mixed solution of the cross-linking agent plus a catalyst which catalyzes the cross-linking solution, said previously mixed solution comprised of from about 1.0 to about 3.0 grams of the cross-linking agent (about 7.5% to about 20% by weight of the final adhesive composition) and from about 0.1 to about 1.0 gram of the catalyst (about 0.5% to about 5% by weight of the final adhesive composition).

To the solution above is added a suitable amount of a filler, said suitable amount ranging from about 0.05 gram to about 0.5 gram (about 0.03% to about 3.0% by weight of the final adhesive composition).

If conductive properties are desired, there is added to the above composition a suitable amount of a conductive material, ranging from abut 5.0 grams to about 10.0 grams (about 55% to about 70% by weight of the reaction mixture).

The type of adhesive composition which is formed by using these components has utility in various bonding applications where high temperature characteristics are important. For example, metal-to-metal bonding and plastic bonding in high temperature environments are examples of where the adhesive can find utility.

Since the adhesive of the present composition can also have good conductive properties, as determined by standard volume resistivity measurements well known to those skilled in the art to which this invention pertains, one particularly suitable use is semiconductor die bonding to chip substrates.

The present invention is further illustrated by the Examples which follow which give certain preferred embodiments for the adhesive of the present invention.

EXAMPLE 1

Polyimide resin (CIBA-GEIGY XU-218 brand), 0.25 gram was dissolved in 1.3 grams of N-vinyl pyrrolidinone. The mixture was heated to abut 80° C. To this was added a previously mixed solution of 0.7 gram total of an epoxy cresol novalac resin (CIBA-GEIGY ECN-1235) plus a NADIC METHYL ANHYDRIDE(POLYSCIENCE) hardener (0.4 gram resin, 0.3 gram hardener). The mixture was cooled down and 0.1 gram of 2-ethyl-4-methyl imidazole dissolved in 20 parts N-vinyl pyrrolidinone was added as a catalyst. To this mixture was then added a premixed 1.4 gram (1.3 gram cross-linking agent, 0.1 gram catalyst) solution of triallyl-S-triazine-2,4,6 trione and di-tertiary butyl peroxide. 0.2 gram of glass filler and 8,8 grams of silver powder were then added to the composition. The composition was first cured at 120° C. for 45 minutes followed by 240° C. for 15 minutes. The adhesive composition gave strong die to substrate binding. Thermogravimetric analysis of the cured composition showed a weight loss of only 0.25% at 400° C. for 10 minutes. The volume resistivity of the cured adhesive was $2.8 \times 10^{-4}$ ohm/cm.

EXAMPLES 2-3

The following Table shows alternative formulations which can be used:

TABLE I

| INGREDIENTS (grams) | EXAMPLE NO. 2 | EXAMPLE NO. 3 |
|---|---|---|
| Polyimide resin (Ciba-Geigy XU-218) | 0.3 | 0.25 |
| N—vinyl pyrrolidinone (NVP) | 1.3 | 1.3 |
| Polyvinyl pyrrolidinone | 0.05 | 0.05 |
| Epoxy cresol novolac resin (CIBA-GEIGY ECN-1235) | 0.4 | 0.4 |
| NADIC METHYL ANHYDRIDE hardener | 0.3 | 0.3 |
| 2-ethyl 4-methylimidazole (solution in NVP) | 0.1 | 0.1 |
| Triallyl-S—triazine-2,4,6 trione | 1.3 | 1.3 |
| Di-tertiary butyl peroxide | 0.4 | 0.4 |
| Glass filler | 0.2 | — |
| Silica filler | — | 0.05 |
| Silver powder | 9.6 | 9.2 |

Weight Loss (%) 400° C./10 min. (3 mil film) 0.37%~0.30%
1 mil = $10^{-3}$ inch

Ion chromatography showed the following water extractable impurities in the cured adhesive of Example 2: sodium <29 ppm, potassium 3 ppm, and chloride 22 ppm.

EXAMPLE 4

This example shows the screen printability of Examples 1, 2, 3, the transfer of the screen printed B-staged adhesive to the wafer, followed by dicing the adhesive attached to the wafer to individual chips containing the adhesive which are then tested for shear strength, void generation, etc. The entire process is detailed below.

A 41/16 inch circle of the adhesive was printed onto an Akrosil$^R$ 4.0 mils (1 mil= $10^{-3}$ inch) 2G/O low density polyethylene film (release liner). The printed adhesive was B-staged (dried) to a tacky state using a forced-air oven set at 50° C. Time was varied from 10 to 16 minutes. Fifteen minutes was chosen for best tack and film strength.

The B-staged adhesive was approximately 0.9 mils thick 0.5 to 1.5 mils thickness was targeted). A cover sheet was placed onto the adhesive via laminative techniques to protect the tacky adhesive from dirt or physical abuse. The cover sheet was a semi-bleached kraft paper with suitable release coating.

The cover sheet was then peeled away from the adhesive and a silicon wafer was mounted to the adhesive, using a Kulicke & Soffa Model 366 Wafer Mounter.

The mounted sample was then diced on a Disco Model DAD-2H Automatic Wafer Scriber-Diser. The diser cut through the wafer, through the adhesive and partially into the 4.0 mils carrier film.

No dies were lost during the dicing operation. The dies were then picked with a tweezer from the carrier film, lifting the adhesive (attached to the dies) from the carrier.

The dies were then attached to a preheated glass substrate. It has been found that preheating the substrate facilitates time for attachment and provides improved wetting to the substrate.

The attachment of the dies to the glass substrate was then accomplished by curing the adhesive using a temperature schedule of:
125° C. for 10 minutes, followed by
175° C. for 10 minutes, followed by
200° C. for 30 minutes
or an alternate schedule could be:
120° C. for 45 minutes, followed by
240° C. for 30 minutes.

Alternatively, a decal method well known to those skilled in the art to which this invention pertains could be used in lieu of the wafer mounter technique previously described.

Die shear, or the measure of bond strength between the die and substrate, was evaluated using a Chatillon force gauge with a push-probe set to complete a force in a horizontal motion. The force required to dislodge each die was recorded. The results are summarized in Table II.

TABLE II

|  | EXAMPLE NO. | | |
|---|---|---|---|
|  | 1 | 2 | 3 |
| METHOD I | | | |
| (cured @ 120° C./45 min. followed by 200° C./30 min.) | | | |
| Die shear (lbs) 200 mil² die | 30 | >30 | 30 |
| % void generation | 5 | 20 | 5 |
| Die shear (lbs) after 430° C./8 min. (lid seal temperature) | 8 | >30 | 5 |
| METHOD II | | | |
| (cured @ 120° C./45 min. followed by 240° C./30 min.) | | | |
| Die shear (lbs) 200 mil² dice | 30 | >30 | 30 |
| % void generation | 5 | 20 | 5 |
| Die shear (lbs) after 430° C./8 min. (lid seal temperature) | 18 | 30 | 12 |

Thus, the lower temperature phase (120° C.) results in an improved attachment of the die/adhesive/substrate; whereas the higher phases complete the cure. Schedules as detailed above provide improved void-free cures as compared to samples cured at high temperatures initially. Method II also shows that the higher temperature cure (120° C./45 min. plus 240° C./30 min.) also provides acceptable die shear values.

Additinal features of the preferred and most preferred embodiments of the present invention are found in the claims hereinafter.

What is claimed is:

1. An adhesive composition comprising: (a) a soluble polyimide resin; (b) an appropriate solvent for said polyimide resin; (c) a tackifier; (d) an epoxy resin; (e) a hardener for said epoxy resin; (f) a catalyst which accelerates the curing of said epoxy resin; (g) a cross-linking agent reactive with the polyimide solvent of (b); (h) a catalyst which catalyzes the cross-linking reaction of (b) and (g); and (i) a filler material.

2. A composition according to claim 1 wherein the soluble polyimide resin is a polyimide resin derived from phenylindane diamines and dianhydrides, polyamide acid or a partially imidized polyamide acid.

3. A composition according to claim 1 wherein said soluble polyimide resin comprises from about 1.5% to about 21% by weight of the reaction mixture.

4. A composition according to claim 1 wherein the polyimide solvent is an ethylenically unsaturated organic compound having one or more unsaturated sites.

5. A composition according to claim 4 wherein said polyimide solvent is N-vinyl pyrrolidinone.

6. A composition according to claim 1 wherein said polyimide solvent comprises from about 15% to about 60% by weight of the adhesive composition.

7. A composition according to claim 1 wherein said tackifier is selected from the group of conventional tackifiers.

8. A composition according to claim 7 wherein said tackifier is polyvinyl pyrrolidinone.

9. A composition according to claim 1 wherein said tackifier comprises from about 0.3% to about 3% by weight of the adhesive composition.

10. A composition according to claim 1 wherein said epoxy resin is a glycidyl polyether of a polyhydric phenol.

11. A composition according to claim 1 wherein said epoxy resin is a glycidyl ether of a polyhydric alcohol.

12. A composition according to claim 1 wherein said epoxy resin is a glycidyl ester of a polycarboxylic acid.

13. A composition according to claim 1 wherein said epoxy resin is a glycidyl polyether of a polyhydric alchohol.

14. A composition according to claim 1 wherein said epoxy resin comprises from but 3% to abot 30% by weight of the adhesive composition.

15. A composition according to claim 1 wherein said hardener for said epoxy resin is an aliphatic amine having at least three active amine hydrogen atoms per molecule.

16. A composition according to claim 1 wherein said hardener for said epoxy resin is an amidoamine obtained by reacting a polyamine with a fatty acid.

17. A composition according to claim 1 wherein said hardener for said epoxy resin is selected from the group consisting of mercaptans and isocyanates.

18. A composition according to claim 1 wherein said hardener for said epoxy resin is an anhydride curing agent.

19. A composition according to claim 18 wherein said hardeners for said epoxy resin are methyl-bicyclo (2.2.1)heptane-2,3 dicarboxylic anhydride isomers.

20. A composition according to claim 1 wherein said hardener for said epoxy resin is an aromatic amine.

21. A composition according to claim 1 wherein said hardener for said epoxy resin comprises from about 3% to about 15% by weight of the adhesive composition.

22. A composition according to claim 1 wherein said catalyst accelerating the curing of said epoxy resin is an alkyl or aryl substituted imidazole catalyst.

23. A composition according to claim 22 wherein said catalyst is 2-ethyl, 2-methyl imidazole.

24. A composition according to claim 1 wherein said catalyst comprises from about 0.3% to about 3% by weight of the adhesive composition.

25. A composition according to claim 1 wherein said cross-linking agent reactive with the polyimide solvent is a polyethylenically unsaturated organic compound.

26. A composition according to claim 25 wherein said cross-linking agent is triallyl-S-triazine-2,4,6 trione.

27. A composition according to claim 2 wherein said cross-linking agent comprises from about 15% to about 60% by weight of the adhesive composition.

28. A composition according to claim 1 wherein said catalyst catalyzing the cross-linking reaction of (b) and (g) is an organic catalyst having a half life of the same order as the cure time at the temperature chosen.

29. A composition according to claim 28 wherein said organic catalyst is an organic peroxide.

30. A composition according to claim 29 wherein said organic peroxide is di-tertiary butyl peroxide.

31. A composition according to claim 28 wherein said organic catalyst is a peroxyketal.

32. A composition according to claim 29 wherein said organic catalyst is a t-amyl peroxide.

33. A composition according to claim 1 wherein said catalyst catalyzing the cross-linking reaction between (b) and (g) is 1,1'-azobis(cyclohexanecarbonitrile).

34. A composition according to claim 1 wherein said catalyst catalyzing the cross-linking reaction between (b) and (g) comprises from about 1.5% to abut 15% by weight of the adhesive composition.

35. A composition according to claim 1 wherein said filler material comprises glass or silica fillers.

36. A composition according to claim 35 wherein said filler is glass.

37. A composition according to claim 36 wherein said filler material comprises glass fillers of a size less than 10 microns and preferably of a melting point from about 350° C. to about 500° C.

38. A composition according to claim 35 wherein said filler is silica.

39. A composition according to claim 38 wherein said filler is silica of a size less than 1 micron.

40. A composition according to claim 1 wherein said filler material comprises from about 0.3% to about 15% by weight of the adhesive composition.

41. A composition according to claim 1, further comprising a conductive material.

42. A composition according to claim 41 wherein the conductive material is a noble metal.

43. A composition according to claim 42 wherein the noble metal is silver.

44. A composition according to claim 42 wherein the conductive material is a noble metal coated on a non-noble metal.

45. A composition according to claim 41 wherein the conductive material comprises from about 55% to about 70% by weight of the reaction mixture.

46. A process for the manufacture of an adhesive composition comprising:
(a) mixing together the polyimide resin and the polyimide solvent,
(b) adding the tackifier which imparts tackiness to the B-staged adhesive film,
(c) mixing together the epoxy and curing agent for the epoxy and then adding this mixture to (b),
(d) adding a catalyst dissolved in the polyimide solvent to mixture (c),
(e) mixing together the second cross-linking agent and a catalyst which catalyzes the cross-linking reaction between the cross-linking agent and the polyimide solvent and adding this mixture to the mixture of (d), and
(f) adding a suitable amount of filler.

47. A process according to claim 46 wherein the soluble polyimide resin is a polyimide resin derived from phenylindane diamines and dianhydrides, polyamide acid or a partially imidized polyamide acid.

48. A process according to claim 46 wherein said soluble polyimide resin comprises from about 1.5% to about 21% by weight of the reaction mixture.

49. A process according to claim 46 wherein the polyimide solvent is an ethylenically unsaturated organic compound having one or more unsaturated sites.

50. A process according to claim 46 wherein said polyimide solvent comprises from about 15% to about 60% by weight of the adhesive composition.

51. A process according to claim 46 wherein said tackifier is selected from the group of conventional tackifiers.

52. A process according to claim 46 wherein said tackifier comprises from about 0.3% to about 3% by weight of the adhesive composition.

53. A process according to claim 46 wherein said epoxy resin is a glycidyl polyether of a polyhydric phenol.

54. A process according to claim 46 wherein said epoxy resin is a glycidyl ether of a polyhydric alcohol.

55. A process according to claim 46 wherein said epoxy resin is a glycidyl ester of a polycarboxylic acid.

56. A process according to claim 46 wherein said epoxy resin is a glycidyl polyether of a polyhydric alcohol.

57. A process according to claim 46 wherein said epoxy resin comprises from about 3% to about 30% by weight of the adhesive composition.

58. A process according to claim 46 wherein said hardener for said epoxy resin is an aliphatic amine having at least three active amine hydrogen atoms per molecule.

59. A process according to claim 46 wherein said hardener for said epoxy resin is an amidoamine obtained by reacting a polyamine with a fatty acid.

60. A process according to claim 46 wherein said hardener for said epoxy resin is selected from the group consisting of mercaptans and isocyanates.

61. A process according to claim 46 wherein said hardener for said epoxy resin is an anhydride curing agent.

62. A process according to claim 46 wherein said hardener for said epoxy resin is an aromatic amine.

63. A process according to claim 46 wherein said hardener for said epoxy resin comprises from about 3% to about 15% by weight of the adhesive composition.

64. A process according to claim 46 wherein said catalyst accelerating the curing of said epoxy resin is an alkyl or aryl substituted imidazole catalyst.

65. A process according to claim 46 wherein said catalyst comprises from about 0.3% to about 3% by weight of the adhesive composition.

66. A process according to claim 46 wherein said cross-linking agent reactive with the polyimide solvent is a polyethylenically unsaturated organic compound.

67. A process according to claim 46 wherein said cross-linking agent comprises from about 15% to about 60% by weight of the adhesive composition.

68. A process according to claim 46 wherein said catalyst catalyzing the cross-linking reaction between the polyimide solvent and the cross-linking agent is an organic catalyst having a half life of the same order as the cure time at the temperature chosen.

69. A process according to claim 68 wherein said organic catalyst is an organic peroxide.

70. A process according to claim 68 wherein said organic catalyst is a peroxyketal.

71. A process according to claim 68 wherein said organic catalyst is a t-amyl peroxide.

72. A process according to claim 46 wherein said catalyst catalyzing the cross-linking reaction between the polyimide solvent and the cross-linking agent is 1,1'-azobis (cyclohexanecarbonitrile).

73. A process according to claim 46 wherein said catalyst catalyzing the cross-linking reaction between the polyimide solvent and the cross-linking agent comprises from about 1.5% to about 15% by weight of the adhesive composition.

74. A process according to claim 46 wherein said filler material comprises glass or silica fillers.

75. A process according to claim 74 wherein said filler is glass.

76. A process according to claim 75 wherein said filler material comprises glass fillers of a size less than 10 microns and preferably of a melting point from about 350° C. to about 500° C.

77. A process according to claim 74 wherein said filler is silica.

78. A process according to claim 46 wherein said filler is silica of a size less than 1 micron.

79. A process according to claim 46 wherein said filler material comprises from about 0.3% to about 15% by weight of the adhesive composition.

80. A process according to claim 46, further comprising the addition of a conductive material.

81. A process according to claim 80 wherein the conductive material is a noble metal.

82. A process according to claim 80 wherein the conductive material is a noble metal coated on a non-noble metal.

83. A process according to claim 80 wherein the conductive material comprises from about 55% to about 70% by weight of the reaction mixture.

84. A process according to claim 46 further comprising curing the adhesive composition at about 90° C. to about 120° C. for a suitable period of time.

85. A process according to claim 84 comprising curing the adhesive composition at about 90° C. to about 120° C. for about 45 minutes.

86. A process according to claim 84 further comprising further curing the adhesive composition at about 200° C. to about 240° C. for a suitable period of time.

87. A process according to claim 86 further comprising further curing the adhesive composition at about 200° C. to about 240° C. for about 30 minutes.

88. A process according to claim 80 further comprising curing the adhesive composition at about 90° C. to about 120° C. for a suitable period of time.

89. A process according to claim 88 comprising curing the adhesive composition at about 90° C. to about 120° C. for about 45 minutes.

90. A process according to claim 88 further comprising further curing the adhesive composition at about 200° C. to about 240° C. for a suitable period of time.

91. A process according to claim 90 further comprising further curing the adhesive composition at about 200° C. to about 240° C. for about 30 minutes.

92. The adhesive composition produced according to the process of claim 46.

93. The adhesive composition produced according to the process of claim 80.

94. The adhesive composition produced according to the process of claim 84.

95. The adhesive composition produced according to the process of claim 86.

96. The adhesive composition produced according to the process of claim 88.

97. The adhesive composition produced according to the process of claim 90.

* * * * *

UNITED STATES PATENT AND TRADEMARK OFFICE
CERTIFICATE OF CORRECTION

PATENT NO. : 4,604,230
DATED : Aug. 5, 1986
INVENTOR(S) : Jagadish C. Goswami et al.

It is certified that error appears in the above—identified patent and that said Letters Patent is hereby corrected as shown below:

Abstract, line 2, "temperature" should be --temperatures--;
Col. 2, line 8, "aso" should read --also--;
Col. 2, line 67, "imidizationis" should read --imidization is--;
Col. 3, line 5, "poliymide" should read --polyimide--;
Col. 3, line 6, "preset" should read --present--;
Col. 3, line 24, "abouy" should read --about--;
Col. 3, line 63, "bis)4-hydroxyphenyl) sulphone" should read --bis(4-hydroxyphenyl) sulphone--;
Col. 3, line 64, "polyhhydric" should read --polyhydric--;
Col. 4, line 21, "epoxylate" should read --epoxylated--;
Col. 5, line 42, "abut" should read --about--;
Col. 5, line 45, "nessarily" should read --necessarily--;
Col. 6, line 52, "abut" should read --about--;
Col. 7, lines 6, 21 and 47, and Col. 8, line 1, "abut" should read --about--;
Col. 8, line 13, "8,8" should read --8.8--;
Col. 8, line 56, "41/16" should read --4 1/16--;
Claim 14, line 2, "but" and "abot" should both read --about--; and
Claim 34, line 3, change "abut" to --about--.

Signed and Sealed this

Thirtieth Day of December, 1986

*Attest:*

DONALD J. QUIGG

*Attesting Officer*          *Commissioner of Patents and Trademarks*